United States Patent [19]
Miller et al.

[11] 3,983,318
[45] Sept. 28, 1976

[54] VELOCITY CORRECTION SYSTEM WITH DAMPING MEANS

[75] Inventors: Michael Evans Miller; John Gordon Amery, both of Indianapolis, Ind.

[73] Assignee: RCA Corporation, New York, N.Y.

[22] Filed: Sept. 2, 1975

[21] Appl. No.: 609,826

Related U.S. Application Data
[63] Continuation of Ser. No. 351,598, April 16, 1973, abandoned.

[52] U.S. Cl. .................... 178/6.6 DD; 179/100.4 E; 310/13; 360/36; 360/70; 179/100.3 V; 179/100.1 B; 178/6.6 R
[51] Int. Cl.[2] ...................... G11B 3/10; G11B 25/04
[58] Field of Search .............. 179/100.4 E, 100.4 R, 179/100.3 V, 100.1 B, 115.5 R; 178/6.6 R, 6.6 A, 6.6 P, 6.6 DD, 6.6 TC; 360/36, 70; 310/12, 13, 27; 335/222, 231

[56] References Cited
UNITED STATES PATENTS

| | | | |
|---|---|---|---|
| 2,556,816 | 6/1951 | Lukacs | 335/222 |
| 3,176,170 | 3/1965 | Fulton et al. | 310/12 |
| 3,349,304 | 10/1967 | Wachter | 310/12 |
| 3,521,092 | 7/1970 | Kalthoff | 310/13 |
| 3,711,641 | 1/1973 | Palmer | 178/6.6 A |

*Primary Examiner*—Bernard Konick
*Assistant Examiner*—Alan Faber
*Attorney, Agent, or Firm*—Eugene M. Whitacre; William H. Meagher; Dilip A. Kulkarni

[57] ABSTRACT

One type of video disc reproducing system senses the capacitance between a stylus and a disc record to reconstruct the video information. The stylus includes a thin conductive element or electrode and rides in a groove of the record, which is rotated at high speeds. The record includes a conductive layer covered with a thin dielectric material. A velocity correction system comprising a closed-loop feedback system provides an advantageous means to vary the position of the pickup means relative to the moving record. This positioning maintains the relative velocity between the two substantially constant for a given radius from the center of rotation, thus correcting for residual velocity errors. There is disclosed a transducer apparatus which is mechanically coupled to the signal pickup means and electrically coupled to circuitry providing a velocity error signal. The transducer has a stationary portion which includes means for generating a magnetic flux. The transducer also has a second portion which is coupled to the pickup stylus and which is movable with respect to the stationary portion. The stationary and movable portions are intercoupled by compliant members. An electrical winding is disposed on the movable portion and is coupled by the magnetic flux such that an electrical current passed through the winding imparts motion to the movable portion. Electrical damping is provided by a closed-loop conductive member on the movable portion which is coupled by the magnetic flux and is operative to oppose motion of the movable portion.

15 Claims, 4 Drawing Figures

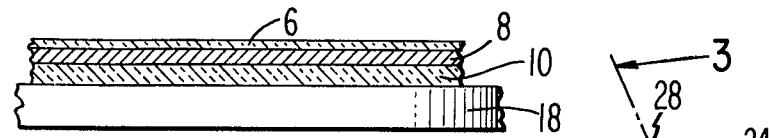
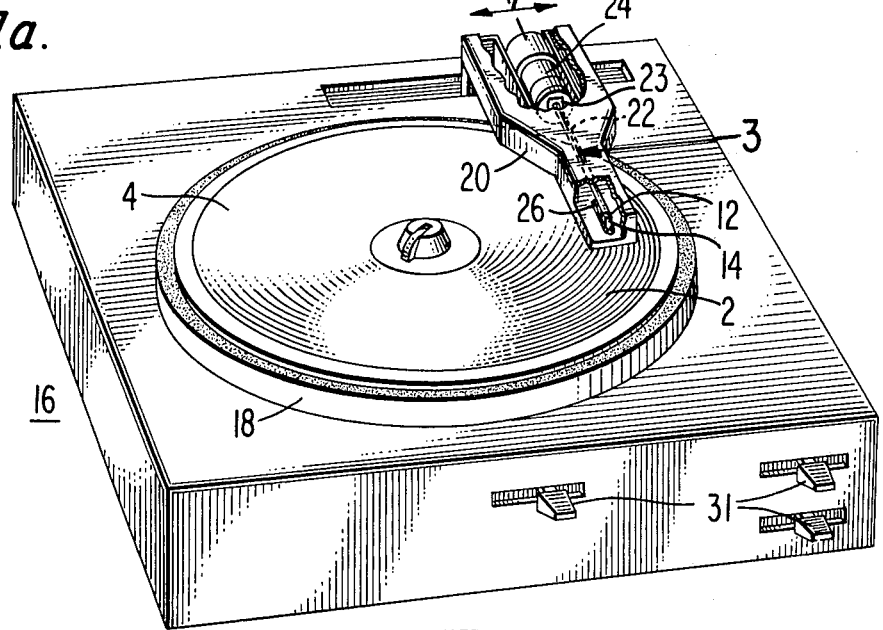
Fig. 1a.
Fig. 1.
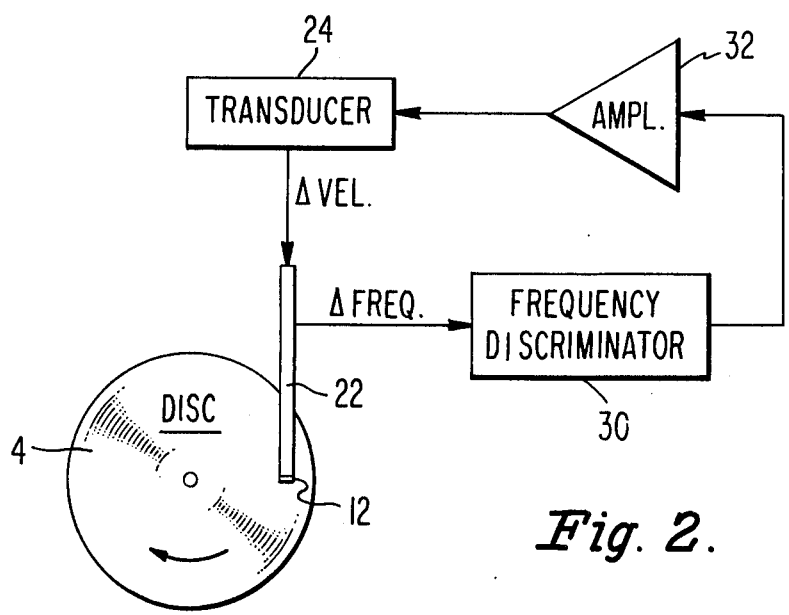
Fig. 2.

VELOCITY CORRECTION SYSTEM WITH DAMPING MEANS

This is a continuation of application Ser. No. 351,598, filed on Apr. 16, 1973, now abandoned.

The invention relates to an apparatus useful in a system for maintaining the relative velocity between a pickup stylus and a signal groove of a video disc substantially constant.

In certain video disc playback systems, video information is recorded by means of geometric variations in a spiral groove on the surface of a disc record. The disc surface may include a conductive material covered with a thin coating of dielectric material. A tracking stylus engages the spiral groove and includes a conductive surface or electrode which cooperates with the conductive material and dielectric coating to form a capacitor.

In systems of the above-described type, as the record is rotated, an edge of the conductive electrode, while riding in the disc groove, cooperates with the record to establish capacitive variations due to the geometrical variations in the spiral groove. The capacitor formed by the record and stylus is coupled to a tuned circuit. Consequently, as the record is rotated, the resulting capacitive variations vary the resonant frequency of the tuned circuit. The tuned circuit may be energized by a fixed frequency oscillator, and thus, as the resonant frequency of the tuned circuit varies (due to the geometrical variations in the spiral groove), the response of the tuned circuit to the excitation signal voltage changes as a function of the recorded information. This provides output signals which vary as a function of the recorded information.

When video signals are recorded on such a disc and replaced using a substantially constant speed turntable and pickup assembly similar to a phonograph player mechanism, it is necessary to maintain the rotational velocity of the disc relatively constant. This prevents "jitter" of the displayed television picture which results when velocity deviations greater than 0.01 percent occur and a conventional television receiver is employed to display the video signal. In addition to picture jitter, if color television signals are being played back, small velocity variations will noticeably deteriorate the quality of the color display.

Velocity errors result from several sources, for example: disc mounting eccentricities, disc warp, disc pressing distortions, recording errors, turntable eccentricities or turntable drive motor shaft and idler assembly eccentricities, or vibrations. Although precise mechanical design and manufacture of the disc and turntable mechanism minimize the velocity errors due to these sources, residual velocity errors may be sufficient to deteriorate the picture quality.

In audio frequency playback systems, the turntable speed is relatively slow and the signal frequency is low compared to video frequency signals. Thus, speed variations (wow and flutter) present in audio playback systems can be adequately reduced by the design of the turntable mechanism, and residual velocity errors of 0.5 percent or less are unnoticeable. With video frequency recording, however, even small velocity errors affect picture quality. A turntable cannot be economically designed for mass consumer use which will provide sufficient rotational speed accuracy to prevent distortion in the reproduced image from a video record. In addition, the video disc itself cannot be inexpensively manufactured to the tolerances necessary to prevent velocity errors between the disc and the pickup stylus which are of a sufficient magnitude to cause picture jitter and color phase distortion of the reproduced television display even if the turntable speed were held constant.

The frequency of the velocity errors which cause picture jitter lies in a range from a very low frequency (such as 6 Hz) to approximately 1KHz. In prior recording systems, the speed of the drive mechanism used to impart motion to the record format (i.e., tape or disc, etc.) has been controlled using a closed-loop motor speed control system. When, however, video signals are to be reproduced where relatively high frequency velocity errors cause picture distortion, the inertia of the mechanical drive means prevents the drive motor from responding to high frequency correction signals and different correction means must be used.

A velocity correction system comprising a closed-loop feedback system provides an inexpensive means to vary the position of the pickup means relative to the moving recording medium in a manner to maintain the relative velocity between the two substantially constant for a given radius from the center of rotation, thus correcting for residual velocity errors. A synchronous motor (3600 r.p.m.) may provide the necessary rotational motion to a video disc (450 r.p.m.) used as the record medium.

Such a velocity correction system includes detection means for detecting the velocity of the recording medium relative to a pickup means. Circuitry is coupled to the detection means and develops an error signal when the detected velocity differs from the desired velocity. An electro-mechanical transducing means is mechanically coupled to the signal pickup means and electrically coupled to the circuit means. The transducing means is responsive to the error signals from the circuit means to vary the position of the signal pickup means in a manner to maintain the relative velocity between the pickup means and the recording medium at the required velocity.

One velocity correction system for correction of errors in the relative velocity between the pickup stylus and disc in a video disc player is more completely described in U.S. Pat. No. 3,711,641, issued Jan. 16, 1973 to Richard C. Palmer.

A system of the type described in the Palmer patent may be referred to as an "armstretcher" system in that the velocity error correcting technique employed effectively serves to variably stretch the pickup arm in the disc player. The present invention is directed to improvements in such an armstretcher system.

Such an armstretcher system is a feedback servo system about the disc-stylus interface which is the summation point where the velocity variation occurs. The velocity variations result in a frequency variation of signals developed by the pickup stylus. The frequency variation can be detected by means such as a frequency discriminator and amplified to provide an energizing signal for driving the correction transducer.

Since the velocity correction or "armstretcher" system is a closed-loop feedback system, it must be stable yet have a desired gain over a certain bandwidth to reduce error in record velocity. A desired range of frequencies for the servo system to correct to move the stylus back and forth along the record groove may be 7.5 Hz to 60 Hz for a record velocity of 450 r.p.m.

The characteristics of the elements of the closed-loop system which are interdependent must be provided in respect of each other to accomplish the result. At the same time, however, there must be provided a desired gain and phase shift or delay for stable operation of the system in accordance with sound closed-loop servo principles. This must be accomplished in a manner to avoid unrealizable or impractical characteristics for the elements of the closed-loop system. In addition, factors such as sensitivity, power dissipation, cost, size, stability with age and environment changes, reproducibility, frequency response and adaptability to the overall player design must be considered and satisfied.

Some degree of flexibility of the electronic components of the loop allows initial consideration for the characteristics of the transducer to take one of three forms. The first is where the natural resonant frequency of the transducer is well above the range of error frequency sought to be corrected, such as a resonant frequency of 1 KHz. The second is a natural transducer resonance within or proximate the operating frequencies of interest of the system. The third is a natural transducer resonant frequency below the frequencies of interest.

The first might initially seem most desirable and has been found to work. However, considerations such as sensitivity, power handling and damping have shown such a transducer somewhat difficult to construct consistently. The third consideration has been found to yield a transducer so compliant that axial or longitudinal motion is difficult to achieve.

The second consideration posed for the transducer, wherein its resonance is within the range of operating frequencies, has been found to be achieved with excellent sensitivity and no power handling problems. In addition, the gain and phase shift of the electronic components of the loop which is needed to complement the transducer has been found more easily achievable. Since the natural resonance of the transducer is within the range of operating frequencies of the system, the damping of the transducer is important and should be reasonably accurate and repeatable. The Q of the transducer, controlled by the damping, should have a value such as between 0.5 to 2, and the damping should not have nonlinearities such as stick-slip.

In accordance with the invention there is provided a transducer for a velocity adjusting system which maintains a predetermined relative velocity between a record medium which is moved at a predetermined velocity and a pickup means positioned adjacent said record medium for detecting signals recorded on the record medium. The system includes means for developing a correction signal when the velocity of the record medium relative to the pickup means deviates from the predetermined relative velocity. Apparatus responsive to the correction signal is provided to vary the physical position of the pickup with respect to the record medium. The apparatus comprises transducing means having a stationary portion which includes means for generating a magnetic flux and a second portion which is movable with respect to the stationary portion. Compliant means intercouple the stationary portion and the second portion. An electrical winding is disposed on the second portion and coupled by the magnetic flux such that an electrical current passed through the winding imparts motion to the second portion. Electrical damping means are coupled by said magnetic flux and are operative to control motion of the second portion. Mechanical means couple the second portion to the pickup means.

A complete understanding of the invention can be obtained from the following detailed description thereof, when taken in conjunction with the accompanying drawings, in which:

FIG. 1 is a perspective view of a video disc playback system.

FIG. 1a is a side elevation view of a type of video disc record.

FIG. 2 is a diagram in block form of a velocity error correction system.

Figure 3:
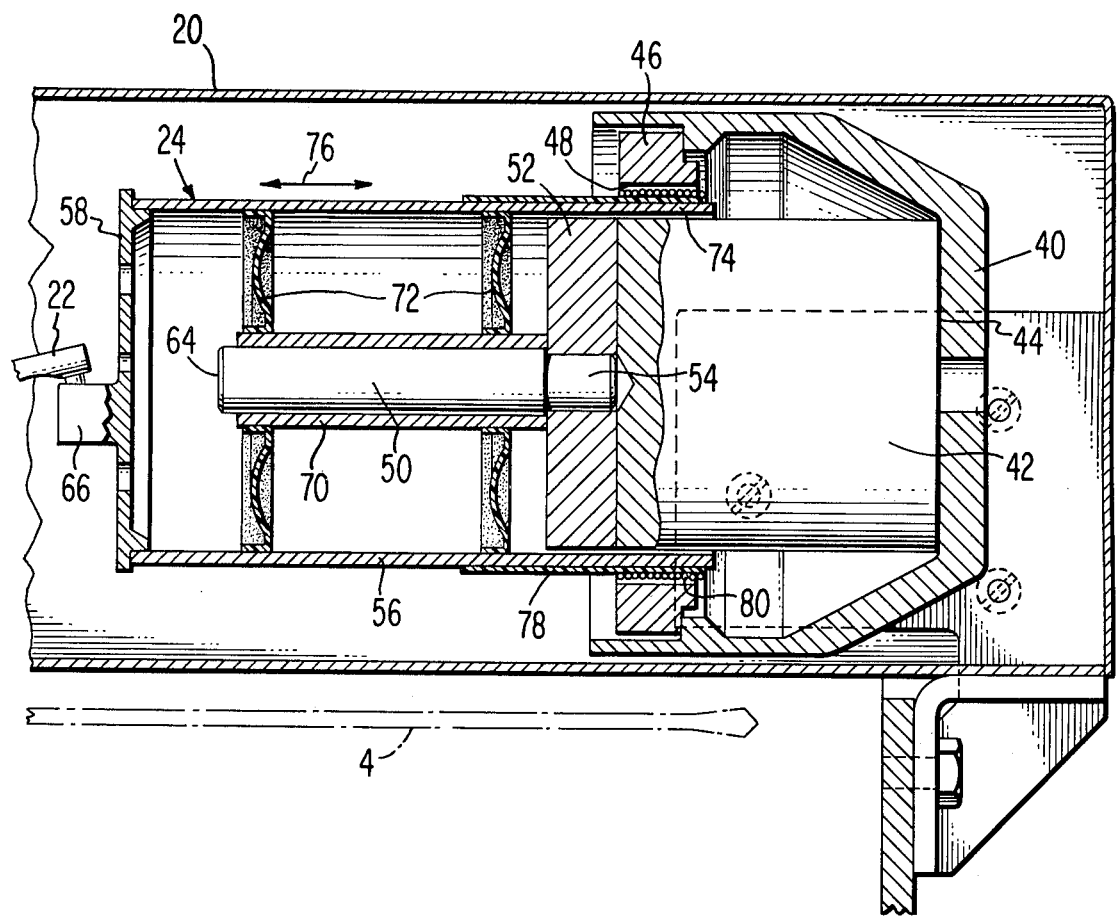
FIG. 3 is a side elevation view in section of an embodiment of a velocity error correction transducer.

Referring to FIG. 1, there is shown in amplified form a video disc playback system of the type referred to supra, which senses the capacitance between a stylus and the disc record to reconstruct video information. The video information is contained in the form of geometric variations in a spiral groove 2 on the surface of the disc record 4. As shown in FIG. 1a, the disc record includes a thin dielectric 6 covering a conductive material 8 which is disposed on a dielectric substrate 10. The tracking stylus 12, which engages the spiral groove 2 of the record 4, supports a conductive electrode 14 cooperating with the conductive material and dielectric coating on the disc record to form a capacitance.

The playback system 16 includes a turntable 18 supporting and rotating the disc record 4. The turntable 18 is driven by a motor and drive mechanism, not shown in the figure, at a rotational speed such as 450 r.p.m.

Within a conductive housing 20, a conductive stylus support arm 22 is mounted at one end to one portion of a flexible pivot 23. The pivot allows the stylus arm to move in a lateral as well as a vertical direction during operation, while providing longitudinal strength (i.e., in the direction of the length of the stylus arm 22). The stylus 12 is secured to the free end of the arm with the stylus electrode 14 electrically coupled by means not shown through the arm 22 to playback circuitry. A further portion of the flexible pivot is secured to the movable portion of a transducer assembly 24. The transducer 24 forms a part of the velocity error correction system which is operative to move the stylus arm 22 longitudinally for correcting velocity errors between the stylus 12 and the disc record 4. Such a transducer assembly is hereinafter described in detail.

An aperture 26 in the housing 20 permits the stylus 12 to pass through the enclosure and contact the disc record 4. The conductive housing 20 with the stylus arm 22, as well as transducer assembly 24, is driven radially relative to the disc record 4 as indicated by the double-headed arrow 28 to allow the stylus 12 to track the record grooves. This may be accomplished by a drive shaft which is engaged by an engaging mechanism, not shown in the figure, which is coupled to the housing 20.

The housing 20 may be arranged to include some of the playback circuitry such as the oscillator and tuned circuit. This minimizes stray capacitance and electrical interference, by placing the circuitry in close proximity with the pickup stylus 12. The balance of the playback circuitry is coupled to the circuitry of the housing 20, but may be housed in a further portion of the playback system.

The mechanical and electrical operating functions of the system may be controlled through suitable coupling to the control knobs 31.

The playback circuitry is arranged to include a horizontal sync separator circuit which is employed to separate the horizontal sync signal components from the composite television signals recovered from the record. This circuitry may also include an amplitude limiter (i.e., clipper) circuit so that the output horizontal sync signals are of a fixed amplitude. When the record is rotated at exactly the proper speed, the frequency of the detected horizontal sync pulses will be the desired sync frequency of, say, 15.734 KHz. Thus, if the turntable has a rotational speed somewhat slower or faster than the proper playback speed or if record disc eccentricities are present, the detected sync pulse frequency will be lower or higher, respectively, than the 15.734 KHz. Either the rotational speed of the turntable, record eccentricities of recording errors will cause the detected sync pulse frequency to deviate from a norm or average such as 15.734 KHz.

As shown in FIG. 2, this frequency change can be detected and an error voltage developed by means such as a frequency discriminator circuit 30. An amplifier 32 amplifies and shapes phase and amplitude of the error voltage variations for applying a drive signal to the transducer assembly 24. The transducer assembly 24, which is coupled to the stylus support arm 22, is responsive to the error voltage drive signal to move the stylus 12 in the longitudinal direction of the arm 22.

FIG. 3 shows details of an embodiment of the transducer assembly 24, which is advantageous in providing the discussed velocity error correction system.

As shown, the transducer assembly includes a hollow annular housing 40. The housing 40 is formed of a material such as iron which is capable of providing a path for magnetic flux through the material of the housing. Within the housing 40 there is disposed a permanent magnet element 42. Although a permanent magnet may be preferable, it will be understood that other sources of magnetic flux such as electro-magnets may be utilized. The magnet preferably has a cylindrical shape and is secured by means such as bonding material to the portion 44 of housing 40, in a manner to provide a magnetic flux path between the magnet and the housing 40. A generally ring shaped member 46 is disposed within the housing 40 and secured thereto by means such as a bonding material. The member 46 is also formed of iron or other suitable material for providing a flux path between the member 46 and housing 40. The member 46 is disposed to surround an end portion of the magnet element 42, but is spaced from the magnet member by a gap 48. An elongated arm 50 is coupled to the magnet member 42 by means of a support element 52 secured to the magnet element 42. The element 52, which may be metal, has an aperture 54 therein for receiving one end of the arm 50, to thereby support the arm in cantilevered manner with respect to the magnet element 42.

A generally cylindrical non-conductive, non-magnetic member 56 is disposed to extend along and surround the arm 50. One end of the member 56 is enclosed by a disc shaped element 58. Secured to the element 58 is a member 66 for coupling the element 58 to the stylus arm 22.

Along the arm 50 between the end portion 64 and the magnet, there is affixed to the arm 50 a mounting sleeve 70. Within the element 56 along the arm 50 there are disposed a pair of relatively spaced generally circular or disc shaped elements 72. The elements 72 have an inner portion secured to the mounting member 70 with a peripheral portion secured to the member 56. The elements 72 are formed of a thin resilient material to provide a compliant support coupling the stationary arm 50 and the movable member 56. In practice the elements 72 may, for example, be formed of paper or a thin plastic material.

The element 56 has an end portion 74 which extends about the magnet element 42 in the gap 48. The end portion 74 is disposed in spaced relation with the magnet 42 and the element 46 to permit free movement of the element 56 in either of the longitudinal directions indicated by the double-headed arrow 76. Secured about the end portion 74 of the element 56 is a closed-loop conductive band 78 formed of a conductive material such as a metal. The conductive band 78 is secured to the element 56 for movement therewith and includes a portion extending into the flux gap 48 between the magnet 42 and the member 46. An electrical winding 80 for energizing the transducer is wound in coiled manner on the conductive band 78. Alternatively the relative positions of the band 78 and winding 80 may be interchanged so as to provide a band which surrounds the coil. Sufficient clearance is provided between the winding 80 and the member 46 to facilitate free movement of the element 56 in either of the longitudinal directions indicated by the double-headed arrow 76. Although not shown, the terminals of the winding 80 in practice are coupled to a source of a velocity error signal such as the amplifier 32 of FIG. 2.

Variation of the transducer structure which includes the basic compliant coupling and electrical damping is possible. The transducer may be provided with a support arm within and fixedly secured to the cylindrical movable member by a rigid coupling. The movable member with the arm is coupled by spaced compliant members to an elongated configured stationary housing having a magnetic flux gap. The housing may be made to surround the movable member with its coil and damping ring disposed to move longitudinally within the housing through the flux gap.

In operation of the transducer assembly described, an electrical signal representing the velocity error in the system is applied to the winding 80. The magnet 42 causes a flux to circulate through a path which includes the element 46, the housing 40 and the magnet 42. The signal on winding 80, which is disposed in the flux gap 48, causes a force to be generated in accordance with known electro-magnetic principles in a direction which moves the element 56 and hence the element 58 in the appropriate one of the longitudinal directions indicated by the double-headed arrow 76 to reduce the velocity error. The resilience of the compliant members 72, which support the element 56, provides a resilient limiting and restoring force for the movable element 56.

The closed-loop conductive band 78 has a portion extending into the flux gap 48. The conductive band 78 is coupled or linked by the magnetic flux which transverses the gap between the magnet 42 and element 46. The movement of the element 56 causes a corresponding movement of the conductive band 78 within the flux gap 48. The movement of the band 78 in response to the energizing signal of winding 80, and in the presence of the magnetic flux, causes current flow to be established in the conductive band which may be thought of as a shorted turn. The currents in the band 78 interact with the magnetic flux in a manner to produce a force which is opposite in sense to that produced by the signal in the winding 80. The force created by the moving conductive band 78 thus provides a force which opposes movement of the element 56 produced by the signal of winding 80. That is, damping is achieved by changing the kinetic energy of the moving coil into heat in the shorted turn 78, with the voltage induced in the shorted conductor being proportional to its velocity and the density of the magnetic flux present. The energy removed from the system is the power ($P_D$) thus dissipated which may be expressed as:

$$P_D = \frac{E^2 \text{ induced}}{R \text{ of shorted turn}}$$

By a proper proportioning of the conductance and mass of the band 78, a precise amount of damping may be provided in the transducer assembly. In addition, because the damping is provided electrically, it is highly repeatable and automatically proportioned in respect of the movement of the element 56, which is sought to be damped. With such an arrangement the problem of erratic stick-slip movement present in mechanical damping arrangements is avoided.

A transducer in accordance with the invention has been fabricated having a shorted turn conductive band one inch wide by 0.003 inch thick disposed about a 1 inch diameter movable member. The result is a transducer having a 0.050 inch peak-to-peak travel of the movable member with a peak velocity sensitivity of 5 inches/second/volt for 60 Hz velocity resonance (i.e., 3db bandwidth at 60 Hz) and a Q of approximately 1.0.

It is noted that the horizontal sync pulses that are recorded on the video disc serve as a convenient frequency reference from which to develop a control signal which is used to drive the transducer and thereby correct velocity errors. Other systems, however, could employ separate recorded frequency for accomplishing the same purpose.

If variations of the rotation speed of a constant speed turntable alone are to be compensated for, this can be accomplished by employing optical detecting means in conjunction with a permanent deflecting pattern on the turntable itself to develop the requisite pulses whose frequency will vary with turntable speed variations. These signals could then be processed and employed to maintain the relative velocity between the stylus and the record constant at a given radius using circuitry and the mechanical structure described in the present application.

In addition, it is also possible to employ a turntable having a variable speed such that the velocity of the groove in the record relative to the stylus is held constant. The velocity correction system with the transducer assembly described herein can likewise be employed with such a turntable to maintain the relative velocity constant.

What is claimed is:

1. In a velocity adjusting system for opposing undesired variations in the relative velocity between a moving record medium and a pickup means which is positioned adjacent to said record medium for detecting signals recorded on said record medium, said system including means for developing a correction signal in response to cyclical variations of said relative velocity falling in a given error frequency range, apparatus responsive to said correction signal to vary the physical position of said pickup means with respect to said record medium; said apparatus comprising:

transducer means having a stationary portion which includes means for generating magnetic flux and a movable portion which is subject to movement with respect to said stationary portion;

resilient means intercoupling said stationary portion and said movable portion, said resilient means being disposed so as to urge said movable portion to return to a null position with respect to said stationary portion when motion of said movable portion causes displacement from such null position;

mechanical means coupling said movable portion to said pickup means;

an electrical winding disposed on said movable portion in the path of said magnetic flux such that said correction signal passing through said winding imparts motion to said movable portion to vary the position of said pickup means in a manner that opposes said undesired variations in relative velocity; and electrical damping means, mounted on said movable portion and disposed in the path of said flux throughout the range of motion of said movable portion for opposing any relative motion of said movable portion with repect to said stationary portion;

wherein the resilience of said resilient means is so related to the other mechanical characteristics of said transducer apparatus as to establish a natural resonance for said transducer apparatus under operating conditions at a frequency falling within said given error frequency range.

2. In a velocity adjusting system for opposing undesired cyclical variations in the relative velocity between a moving record medium and a pickup means which is positioned adjacent to said record medium for detecting signals recorded on said record medium, said system including means for developing a correction signal in response to cyclical variations of said relative velocity falling in a given error frequency range, apparatus coupled to said pickup means and responsive to said correction signal to vary the physical position of said pickup means with respect to said record medium; said apparatus comprising:

transducer means having a stationary portion which includes a magnet and an arm secured thereto, said transducer means further including an elongated movable portion disposed in spaced relation with said stationary portion;

resilient means intercoupling said arm of said stationary portion and said movable portion, said resilient means being disposed so as to urge said movable portion to return to a null position with respect to said stationary portion when motion of said movable portion causes displacement from such null position;

an electrical winding disposed on said movable portion adjacent to said magnet such that said correction signal passing through said winding imparts motion to said movable portion along said arm to vary the position of said pickup means in a manner that opposes said cyclical variations of said relative velocity; and electrical damping means connected to said movable portion and adjacent to said magnet, for opposing any relative movement of said movable portion with respect to said stationary portion;

wherein the resilience of said resilient means is so related to the other mechanical characteristics of said transducer apparatus as to establish a natural resonance for said transducer apparatus under operating conditions at a frequency falling within said given error frequency range.

3. The invention according to claim 2, wherein said electrical damping means includes a closed-loop electrically conductive member disposed on said movable portion adjacent to said winding.

4. The invention according to claim 3, wherein said conductive member comprises a generally circular metal band and said electrical winding comprises a coil of insulated wire surrounding said band.

5. The invention according to claim 2, wherein said resilient coupling means comprises first and second resilient members in mutual spaced relation along said arm.

6. The invention according to claim 2, wherein said arm is elongated and extends in cantilevered manner from said magnet, said movable portion having a generally hollow cylindrical shape mounted coaxially with said arm.

7. The invention according to claim 6, wherein said resilient coupling means comprises a member having a generally annular disc shape with an inner portion secured to the outside surface of said arm and a peripheral portion secured to the inside surface of said hollow cylindrical movable portion.

8. A transducer apparatus for use with a velocity adjusting system and responsive to a correction signal to oppose cyclical variations in relative velocity between a moving record medium and a pickup means which is positioned adjacent to said record medium for detecting signals recorded on said record medium, said system including means for developing said correction signal in response to cyclical variations of said relative velocity falling in a given error frequency range, and means coupling said transducer apparatus to said pickup means to vary the physical position of said pickup means with respect to said record medium; said transducer apparatus comprising:

means having a stationary portion and a movable portion, said stationary portion including a magnet and an elongated support arm coupled to said magnet, said movable portion extending along and in spaced relation about said support arm;

resilient means along said support arm intercoupling said movable portion with said support arm, said resilient means being oriented so as to urge said movable portion to return to a null position with respect to said stationary portion when motion of said movable portion causes displacement from said null position;

a closed-loop electrically conductive member, affixed to said movable portion adjacent to said magnet, and operative to oppose any relative movement of said movable portion with respect to said stationary portion; and an electrical winding disposed on said movable portion such that said correction signal passing through said winding imparts motion to said movable portion along said support arm to vary the position of said pickup means in a manner that opposes said cyclical variations of relative velocity;

wherein the resilience of said resilient means is so related to the other mechanical characteristics of said transducer apparatus as to establish a natural resonance for said transducer apparatus under operating conditions at a frequency falling within said given error frequency range.

9. The invention according to claim 8, wherein said movable portion includes a generally hollow cylindrical member, and said resilient means includes a generally annular disc shaped resilient member having an inner portion secured to the outside surface of said support arm and a peripheral portion secured to the inside surface of said hollow cylindrical movable portion to dispose said movable portion coaxially of said support arm.

10. The invention according to claim 8, wherein said closed-loop electrically conductive member comprises a metal band, said band and said winding being arranged to be coupled by the flux of said magnet, whereby in response to motion of said movable portion, currents are induced in said band providing a reactive electromotive force which opposes motion of said movable portion.

11. Transducer apparatus in accordance with claim 8, wherein the dimensions and conductance of said conductive member are chosen so that the electrical damping provided by said conductive member under operating conditions limits the Q of said transducer apparatus to a value no greater than 2.

12. In a velocity adusting system for opposing undesired cyclical variations in the relative velocity between a rotating grooved disc record and a groove tracking stylus, said system including means for developing a correction signal in response to cyclical variations of said relative velocity falling in a given error frequency range, apparatus mechanically coupled to said stylus and responsive to said correction signal to vary the physical position of said stylus with respect to said record; said apparatus comprising:

transducer means having a stationary portion which includes means for generating a magnetic flux, and also having a movable portion;

resilient means intercoupling said stationary portion and said movable portion and locating said movable portion in spaced relation with said stationary portion, said resilient means being disposed so as to urge said movable portion to return to a null position with respect to said stationary portion when motion of said movable portion causes displacement from such null position;

an electrical winding disposed on said movable portion in the path of said flux such that application of said correction signal to said winding imparts motion to said movable portion to vary the position of said stylus in a maner opposing said cyclical variations of said relative velocity;

electrical damping means, disposed on said movable portion in such manner as to intersect the path of said flux for all positions of said movable portion, for opposing any movement of said movable portion caused by application of said correction signal to said winding;

the compliance of said resilient means being of a magnitude to provide said position varying apparatus with a mechanical resonance at a frequency within said given error frequency range.

13. Apparatus in accordance with claim 12, wherein:
said movable portion comprises a hollow cylindrical member; and
said damping means comprises a conductor encircling said cylindrical member and dimensioned to provide a damping factor establishing the Q of said mechanical resonance of said position varying apparatus at a value between 0.5 and 2.

14. In a velocity adjusting system for opposing undesired cyclical variations in the relative velocity between a rotating grooved disc record and a groove tracking stylus, said system including means for developing a correction signal in response to cyclical variations of said relative velocity falling in a given error frequency range, apparatus mechanically coupled to said stylus and responsive to said correction signal to vary the physical position of said stylus with respect to said record; said apparatus comprising:

transducer means having a stationary portion which includes means for generating a magnetic flux, and also having a movable portion;

resilient means intercoupling said stationary portion and said movable portion and locating said movable portion in spaced relation with said stationary portion, said resilient means being disposed so as to urge said movable portion to return to a null position with respect to said stationary portion when motion of said movable portion causes displacement from such null position; and an electrical winding disposed on said movable portion in the path of said flux such that application of said correction signal to said winding imparts motion to said movable portion to vary the position of said stylus in a manner opposing said cyclical variations of said relative velocity;

wherein the resilience of said resilient means is so related to the other mechanical characteristics of said transducer apparatus as to establish (1) a natural resonance for said position varying apparatus at a frequency falling within said given error frequency range, and (2) a Q of said natural resonance for said position varying apparatus at a value between 0.5 and 2.

15. Apparatus in accordance with claim 14, wherein:

said movable portion comprises a hollow cylindrical member; and said position varying apparatus includes damping means comprising a conductor encircling said cylindrical member and dimensioned to provide a damping factor establishing the Q of said natural resonance of said position varying apparatus at a value between 0.5 and 2.

* * * * *